Patented Feb. 7, 1933

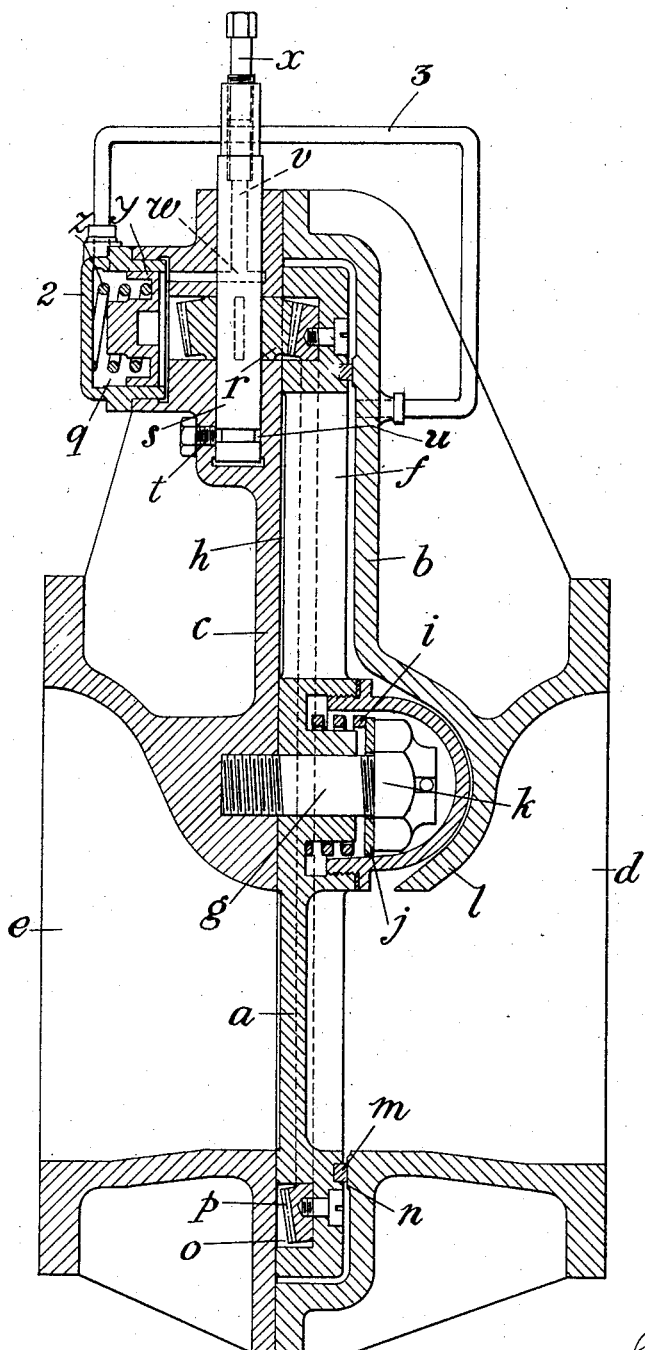

1,896,778

UNITED STATES PATENT OFFICE

ROBERT WILLIAM LEACH AND WILLIAM HENRY BATEMAN, OF NEWPORT, ENGLAND

VALVE

Application filed October 17, 1930, Serial No. 489,400, and in Great Britain August 20, 1930.

This invention relates to valves with particular reference to sliding plate or rotary disc type valves.

The object of the present invention is to provide improved means for lubricating the moving parts of such valves, and also to facilitate their operation particularly when, as may frequently occur during long periods of dis-use, the plate or disc becomes rusted or corroded on its seat.

The invention consists in a valve of the type referred to in which the plate or disc is under the control of a yielding or resilient member or medium and is associated with means whereby lubricant under pressure may be made to act upon the plate or disc in opposition to such resilient member.

The invention also consists in a valve of the above character in which the pressure of the lubricant is subject to control by means of a piston actuated by spring or fluid pressure or both or by other convenient means.

Further features of the invention will be apparent from the description given hereafter.

The accompanying drawing illustrates in section a valve constructed in accordance with this invention.

In the application of our invention, as shown, to a valve in which a disc $a$ can be rotated or oscillated in a fixed body, we form the body of two parts $b$, $c$, suitably fastened together to make a fluid tight joint, one part containing the inlet port $d$ while the other part contains the outlet port $e$, the disc valve being formed with one or more segmental or other openings $f$ for controlling the connection between the ports either or both of which may be of kidney or other suitable shape. The disc is mounted for rotation upon a central stud $g$ secured to the outlet body, and is held in contact with the body face $h$ by spring or other suitable elastic means. For example, a spring $i$ may be arranged in a recess in the boss or central part of the disc and held in place by a washer $j$ upon the stud which washer is secured by means of a nut $k$ over which, if necessary or desirable, we may arrange a cap $l$ which may be secured to the disc to protect the pivot and spring.

A resilient packing ring $m$ may be arranged in that face of the disc which is adjacent to the inlet body and may co-operate with an annular seating $n$ upon said body part for the purpose of excluding sediment or deposits from entering between the disc and inlet casing. In an annular recess $o$ upon the other face of the disc we arrange a bevel wheel or circular rack $p$, this recess being in communication with a lubricant reservoir $q$ and normally full of lubricant.

The bevel wheel or circular rack or other gear member co-operates with a pinion $r$ or other drive member keyed upon an operating spindle $s$ which is mounted in the outlet body and which may be retained within the body by means of a set pin $t$ engaging a peripheral recess $u$ in the operating spindle. The spindle is provided with an axial bore $v$ adapted to contain a supply of viscous lubricant, and the axial bore may have one or more radial passages $w$ associated therewith so that by means of a screw $x$ or other pressure device the lubricant may be forced into the reservoir $q$ and the annular recess $o$ above referred to; the chamber $q$ which is formed on the outlet body contains a piston $y$ actuated by spring $z$ or fluid pressure or both, as indicated by the pipe 3 leading from the intake side of the valve to the chamber, and is held in place by a piston cap 2 or otherwise. The arangement is such that the pressure of the lubricant can be increased by means of the screw $x$ until it can overcome the spring $i$, the cohesion between the disc and its seating, and the fluid pressure acting on the disc, for facilitating the operation of the disc. For the maintenance of sufficient pressure on the lubricant to ensure proper lubrication of the disc and its seating under normal conditions the pressure exerted by the piston $y$ is relied upon.

Having thus described our invention what we claim as new and desire to secure by Letters Patent is:—

1. In a valve of the character described, the combination with a valve casing provided with a valve seat, a rotary valve disc cooperating with said valve seat, resilient means for holding the valve disc on its seat, an annular groove provided in the working face of the valve disc and disposed toward the valve seat, said groove forming a recess for a lubricating fluid, a toothed rack located in the groove, the valve casing having a recess for the reception of lubricating fluid, a pinion located in the recess for engaging the rack, and means for applying pressure to the lubricating fluid.

2. In a valve of the character described, a valve casing provided with a valve seat, a rotary disc cooperating with said seat, a spring for holding the disc against its seat, an annular groove in the face of the disc which abuts against the seat, a toothed rack located within said groove, a recess in the casing for containing lubricant, a pinion located in said casing recess and engaging with the rack, means for supplying lubricant to said casing recess under pressure, and pressure means operative upon the lubricant in the casing recess to force the same into the annular groove in the disc.

3. In a valve of the character described, a valve casing provided with a valve seat, a rotary disc cooperating with said seat, spring means for holding the disc against its seat, an annular groove in the disc facing the seat, a toothed rack located in said annular groove, a recess located in the casing for containing lubricant, said recess communicating with the groove, a pinion located in said recess and engaging with the rack, means for supplying lubricant to said recess under pressure, and pressure means consisting of a spring-pressed piston operative upon the lubricant in the recess to force the lubricant into the annular groove in the disc.

4. In a valve of the character described, a valve casing provided with a seat, a rotary disc in said casing cooperating with said seat, said disc having a grooved working face, a toothed rack in said groove, a recess in the casing, a pinion located in said recess, a spindle on which said pinion is mounted, said spindle being provided with an axial bore through which lubricant is fed to the casing recess, and a spring-pressed piston for forcing lubricant fed by way of the spindle, toward the groove in the disc.

5. In a valve of the character described, a valve casing having a seat, a rotary disc cooperating with said seat and provided with a grooved working face, means operative in the groove for rotating the disc, a lubricant-holding chamber enclosing the disc-rotating means and communicating with the grooved face of the disc and means for supplying lubricant under pressure to the chamber.

6. In a valve of the character described, a valve casing having a seat, a rotary valve member cooperating with said seat and provided with a grooved working face, means entering into the groove in the valve face for rotating the valve, a lubricant-holding chamber in the valve casing enclosing the valve-rotating means and communicating with the groove in the valve face, means for supplying lubricant under pressure to the chamber, and means operative upon the lubricant in the chamber for forcing said lubricant toward the groove in the valve face.

In testimony whereof we have signed our names to this specification.

ROBERT WILLIAM LEACH.
WILLIAM HENRY BATEMAN.